United States Patent [19]

Badovinatz et al.

[11] Patent Number: 5,926,619

[45] Date of Patent: *Jul. 20, 1999

[54] APPARATUS AND PROGRAM PRODUCT FOR RECOVERY OF A NAME SERVER MANAGING MEMBERSHIP OF A DOMAIN OF PROCESSORS IN A DISTRIBUTED COMPUTING ENVIRONMENT

[75] Inventors: Peter Richard Badovinatz, Kingston; Tushar Deepak Chandra, Elmsford; Orvalle Theodore Kirby, Poughkeepsie; John Arthur Pershing, Jr., Buchanan, all of N.Y.

[73] Assignee: International Business Machines Corporation, Armonk, N.Y.

[ * ] Notice: This patent is subject to a terminal disclaimer.

[21] Appl. No.: 09/002,857

[22] Filed: Jan. 5, 1998

Related U.S. Application Data

[62] Division of application No. 08/684,247, Jul. 23, 1996, Pat. No. 5,805,786.

[51] Int. Cl.$^6$ ..................................................... G06F 11/00
[52] U.S. Cl. ....................................................... 395/182.02
[58] Field of Search ............................... 395/185.02, 671, 395/672, 676, 680, 682, 200.03, 200.19, 200.31, 200.35, 182.02, 180; 364/282.1, 286

[56] References Cited

U.S. PATENT DOCUMENTS

| | | | |
|---|---|---|---|
| 4,800,488 | 1/1989 | Agrawal et al. | 364/200 |
| 4,825,354 | 4/1989 | Agrawal et al. | 364/200 |
| 4,853,843 | 8/1989 | Ecklund | 364/200 |
| 5,222,217 | 6/1993 | Blout et al. | 395/325 |
| 5,408,649 | 4/1995 | Beshears et al. | 395/575 |
| 5,475,819 | 12/1995 | Miller et al. | 395/200.03 |
| 5,577,252 | 11/1996 | Nelson et al. | 395/670 |
| 5,596,720 | 1/1997 | Hamada et al. | 395/200.03 |
| 5,623,666 | 4/1997 | Pike et al. | 395/616 |
| 5,664,185 | 9/1997 | Landfield et al. | 395/615 |
| 5,704,032 | 12/1997 | Badovinatz et al. | 395/182.02 |
| 5,787,249 | 7/1998 | Badovinatz et al. | 395/200.31 |
| 5,790,788 | 8/1998 | Badovinatz et al. | 395/200.31 |

OTHER PUBLICATIONS

"A Symmetric and Resilient Configuration Scheme for Multiple Name Servers", A. Nakajima,, IEEE 1991, pp. 651–658.

*Primary Examiner*—Robert W. Beausoliel, Jr.
*Assistant Examiner*—Stephen C. Elmore
*Attorney, Agent, or Firm*—Floyd A. Gonzalez

[57] ABSTRACT

Detecting the failure of the name server node and consulting a membership list of nodes in the domain to determine the crown prince (CP) node who is next in line to become the name server. The other available nodes in the domain periodically send recover messages to the CP node, and responsive to receiving the recover messages from all the other available nodes in the domain, the CP node perform a two phase takeover whereby the CP node becomes the name server for managing said processors in the domain. After the CP node becomes the name server, the other available nodes in the domain send data to the new name server necessary for the name server to manage the other available nodes in the domain. All request messages requesting management by the name server are stored locally until after the CP becomes the name server. The locally stored request messages are then processed by the other available nodes such that no request messages are lost during recovery.

18 Claims, 5 Drawing Sheets ical description of the preferred embodiment of the
APPARATUS AND PROGRAM PRODUCT FOR RECOVERY OF A NAME SERVER MANAGING MEMBERSHIP OF A DOMAIN OF PROCESSORS IN A DISTRIBUTED COMPUTING ENVIRONMENT

CROSS REFERENCE TO RELATED APPLICATIONS

This application is a division of pending application Ser. No. 08/684,247 filed Jul. 23, 1996—U.S. Pat. No. 5,805,786 issued Sep. 8, 1998.

The present invention relates to distributed computing environments, and more particularly to managing membership of a domain of one or more processors of the distributed computing environment.

BACKGROUND OF THE INVENTION

In a distributed computing environment, the computer contains a plurality of computer nodes which process data in parallel. In many such systems, the nodes may be organized into partitions, with each partition having one or more domains. Each domain may be running a different computer program. In many of these systems, a single node controls each domain. As each node becomes available by coming on line or coming up, the node must be assigned to a domain, and the other nodes in the domain must become aware of the new node such that tasks of the program running in the partition may be shared. In some systems this is done by each node sending a message to every other node in the system to determine such information as which node is controlling the domain and which tasks are assigned to which nodes.

In high availability applications wherein there is a recovery process to recover a failed node, it is necessary for the failed node which is recovering to find out the same information as a new node coming on line for the first time. There is a further requirement in that if the failed node is the node that controls the domain, it is necessary to appoint a new node to take over control of the domain within a partition. Many times this is done by sending a message from each node to every other node in the domain to find out which nodes are still available and to attempt to assign a new control node. The result of such schemes is to send out a heavy volume of message traffic each time a node comes up or is recovered.

SUMMARY OF THE INVENTION

The present invention provides a PROCLAIM protocol for a new node wishing to join a domain such that only messages are sent to a name server node which controls the admission of new nodes.

The present invention also provides a PROCLAIM protocol which allows a new node to be made a name server with messages being sent only between the nodes already up and the name server.

The present invention also provides a FLICKER protocol to confirm if a node reported to be down is really down, or if it only appears to be down.

The present invention also provides a RECOVER protocol which requires a message to be sent to only a name server node to effect recovery of a failed node.

The present invention also provides a RECOVER protocol which allows a new name server to be determined when the old name server fails, with the RECOVER protocol requiring only messages between the new name server and the other nodes in the domain.

The present invention also provides a RECOVER protocol which allows the recovery process to be terminated and the old name server to resume its duties if the old name server becomes available before the RECOVER protocol is completed.

An object of the present invention is to provide for establishing a name server node for all the nodes in a domain as the nodes first come on line.

It is another object to provide a protocol for confirming whether a node is up or down when the node is experiencing flicker.

It is also an object of the present invention to provide a protocol for recovery such that a new name server may be selected when the old name server node fails or goes down.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
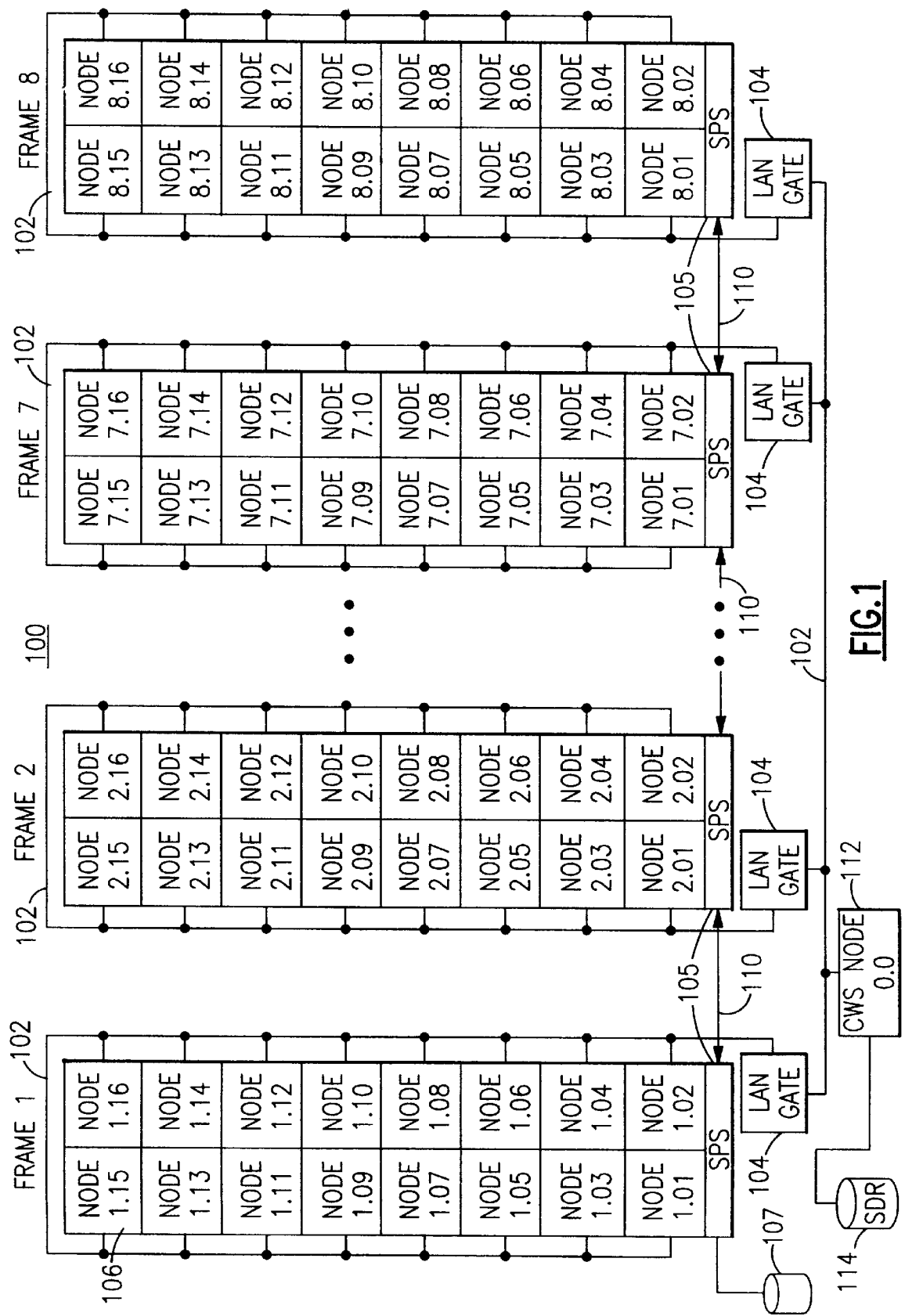
FIG. 1 is a schematic diagram of a distributed computer system of the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are 10 also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends messages and data to the nodes 106 by means of the LAN 102 while messages and data may be sent from one to another of the nodes 106 by means of the SP switches 105.

Each of the nodes 106 and the CWS 112 of the SP computer system 100 includes a group services daemon, as explained in U.S. patent application 08/640,412 by P. R. Badovinatz et al. for "A Method for Managing Membership of a Group of Processors in a Distributed Computing Environment", assigned to the assignee of the present invention and incorporated herein by reference. Each of the nodes 106 may include software or hardware, or a combination, which reports to all the other nodes those nodes which are up and available for use. If any of the nodes 106 fails, its identity is made known to the other nodes by a process known as a heartbeat function. As is known, the nodes 106 of the SP computer system 100 may be divided into partitions.

Figure 2:
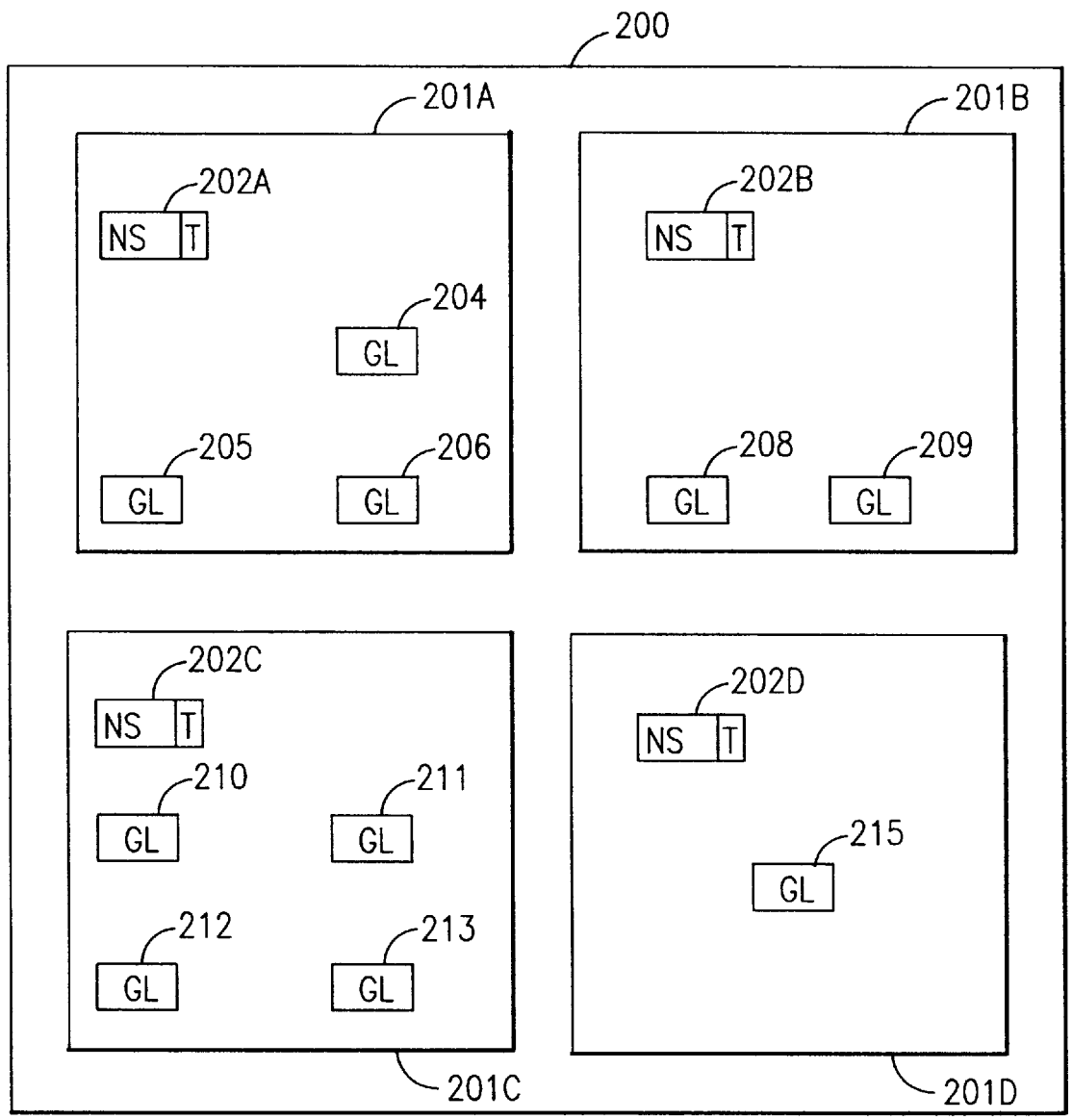
FIG. 2 is a block diagram of domains of processors in the distributed computer system of FIG. 1.

FIG. 2 is a block diagram showing a partition 200 of the nodes 106. The partition 200 may be further subdivided into one or more domains. For example, the partition 200 in FIG. 2 is subdivided into four domains, domains 201a–201d. Each domain 201 includes a name server 202. For instance, the example of FIG. 2, the domains 201A–201D have name servers 201A–201D, respectively. The nodes in a domain 201 may be members of one or more groups, each group served by a group leader. For instance, the nodes in the domain 201A are members of three groups, with each group served by the group leaders 204, 205, and 206. The nodes in the domain 201B are members of two groups, each group served by the group leaders 208 and 209. Likewise, the nodes of domain 201C are members of four groups, each group served by the group leaders 210, 211, 212, and 213. The nodes in domain 201D are members of a single group, which group is served by group leader 215. The main function of the name server is to direct each node wanting to join a group in the domain to that group's group leader (GL), and to insure that the group names are unique within the domain. The managing of membership of a group of processors, and the function of the group leaders is fully described in the aforementioned U.S. patent application Ser. No. 08/640,412. The information needed to direct a node to the group leader of the group the node wishes to join is kept in a table T maintained by each name server for the groups in its domain. The table T and its entries is further described in U.S. patent application Ser. No. 08/684,246, filed Jul. 23, 1996 by P. R. Badovinatz et al. for MANAGING GROUP EVENTS BY A NAME SERVER FOR A GROUP OF PROCESSORS IN A DISTRIBUTED COMPUTING ENVIRONMENT (Attorney Docket No. PO9-96-080), owned by the assignee of the present invention.

Among the purposes of the present invention is to add new nodes to a domain, to remove nodes from a domain when they fail, and to recover a domain when its name server node fails.

In the present invention, the functions of the name server are:

1. to proclaim to all new nodes such that the new nodes are able to identify the name server node;
2. if a node fails, to delete the failed node from the domain in a manner similar to removing a node from a group, as described in the aforementioned U.S. patent application Ser. No. 08/640,412; and
3. to collect grovel messages from new nodes, and then insert the grovelling node into the domain.

In one embodiment, as domains discover each other, the name server of the smaller domain (or highest numbered name server if the sizes are equal) dissolves his domain, which results in all the nodes joining the other domain.

Figure 3:
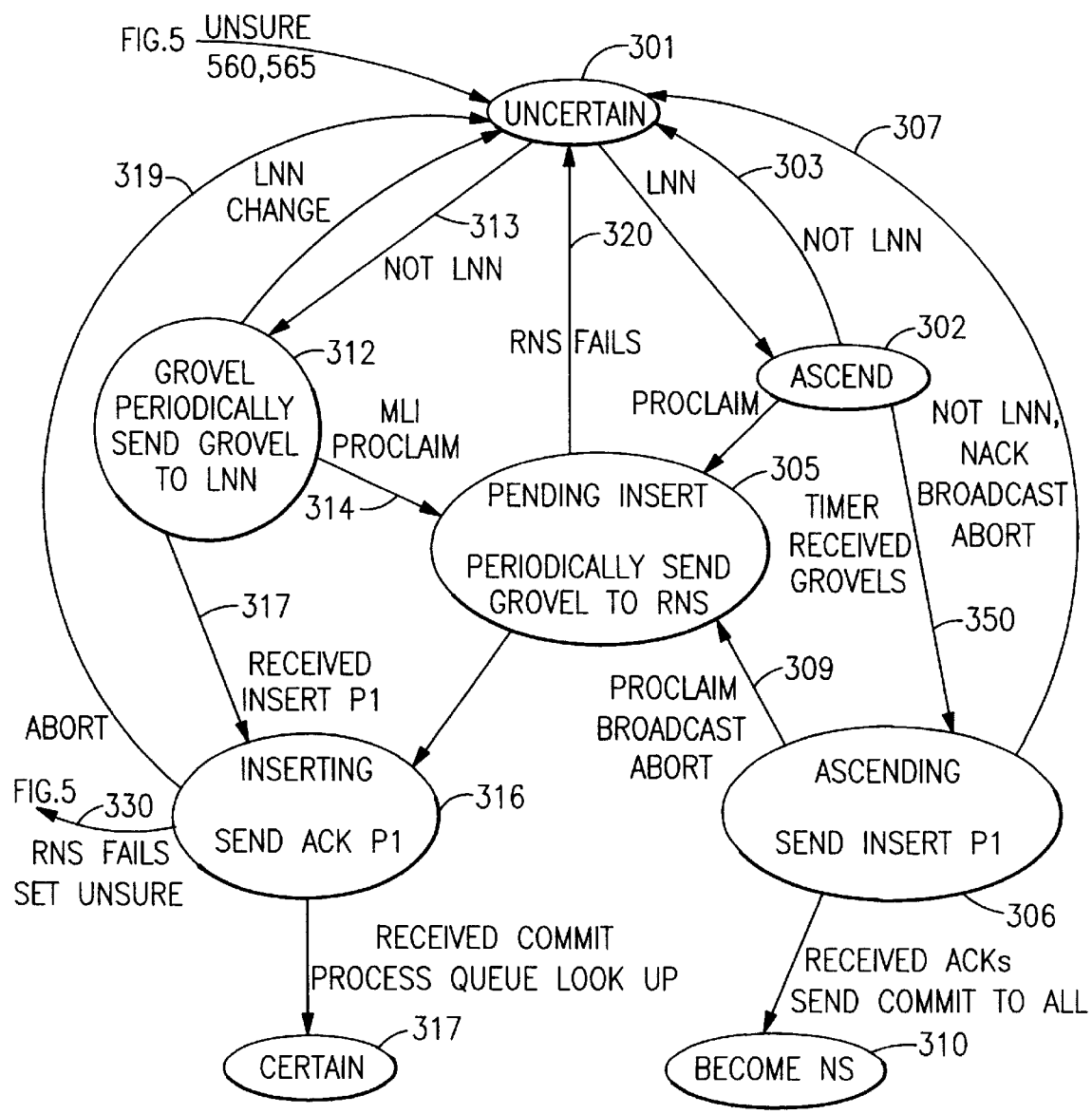
FIG. 3 is a protocol state diagram of the PROCLAIM protocol whereby a processor joins a domain of FIG. 2.

FIG. 3 is a protocol state diagram of the PROCLAIM protocol wherein a new node is added to a domain. Each node 106 is added to only one domain. In the remainder of the disclosure, only one domain will be discussed for simplicity. When a new node first becomes available, it enters the uncertain state 301. The new node then consults its local heartbeat function to determine if it is the lowest numbered node (LNN). In the present convention, an effort is made to assign the name server to the lowest numbered node in the domain.

If the new node is the lowest numbered node, it goes to the ascend state 302. If while in the ascend state 302 the node discovers a new node has become available which has a lower number, the node recognizes that it is not the lowest numbered node and it returns to the uncertain state 301 as shown at 303. If while in the ascend state 302, the node receives a PROCLAIM message indicating that a name server node already exists for this domain, the node goes to the pending insert state 305, which will be explained later. If the node while in the ascend state 302 receives grovel messages from all of the other nodes which are available, as will be discussed, the node goes to the ascending state 306. While in the ascending state 306, the node sends an insert phase one (P1) message to all of the other nodes that have grovelled to it. The insertion of a new node into a domain is the same as insertion of a node into a group, as is discussed in the aforementioned U.S. patent application Ser. No. 08/640,412.

When each of the other nodes receive an insert phase one message it will respond with either an acknowledge (ACK) message indicating that it agrees with the action, or it will return a negative acknowledge (NACK) message indicating that it does not agree with the action. A node may return a NACK message when it is the name server. If while in the ascending state 306, the node discovers that it is not the lowest numbered node or it has received a NACK message, it will broadcast an abort message telling the other nodes to abort the insert process, and will return to the uncertain state 301 via 307. If while in the ascending state 306, the node receives a PROCLAIM message from a name server node, the node will broadcast an abort message and go to the pending insert state 305 via 309.

If while in the ascending state 306, the node receives ACK messages from all of the other nodes, it will send a commit message to all of the other nodes indicating that it is now the name server, and will go to the become name server state 310. At this point, the domain has been formed, all domain nodes are in a certain state 317 or 310, and all nodes know which node is the name server.

Returning to the uncertain state 301, if the new node determines that it is not the lowest numbered node, it will move to the grovel state 312 via 313. In the grovel state 312, the node will periodically send a grovel message to the lowest numbered node. This grovel message indicates to the lowest numbered node, that the new node wishes to join its domain and recognizes it as the lowest numbered node the new node knows about. If the lowest numbered node is already a member of the domain and recognizes another node as the name server, it will send a message back to the new node indicating who the name server is with a my leader is (MLI) message. The node identified as the name server in an MLI message will be known as the reputed name server (RNS).

The new node, while in the grovel state 312, may receive a PROCLAIM message from another node indicating that other node is established as a name server. If the new node receives either an MLI or a PROCLAIM message, it moves to the pending insert state 305 via 314. If while in the grovel state 312 the new node receives a proper insert P1 message, the new node goes to the inserting state 316 via 317. While in the inserting state 316 the new node sends an ACK P1 message to the node sending the insert P1 message. If while in the inserting state 316, the node receives an abort message, the new node moves to the uncertain state 301 via 319. If while in the inserting state 316, the new node receives a commit message in response to its ACK P1 message, the new node moves to the certain state 317 wherein the new node has been admitted to the domain and now knows who the name server node is.

While in the pending insert state 305 the new node periodically sends a grovel message to the reputed name server node (RNS) as was identified by the receipt of either the MLI message or the PROCLAIM message earlier. If, while in the pending insert state 305, the node discovers via its local heart beat function that the RNS node has failed, the new node returns to the uncertain state 301 via 320. If, however, while in the pending insert state 305, the new node receives an insert P1 message from the proper RNS, it moves to the inserting state 316 and sends an ACK P1 message, as previously explained. If, while in the inserting state 316, the node discovers via its local heart beat function that the RNS node has failed, the node goes to the uncertain state 502 via 330, as will be discussed.

It will be understood that whenever the new node returns to the uncertain state 301 it will begin the entire process over again moving from state to state until the new node either becomes the name server at 310 or is admitted into the domain in the certain state at 317.

Returning to ascend state 302, a coronation timer 350 is included to allow the heartbeat function to discover other available nodes so that the largest possible single domain is formed. The coronation timer is set when the ascend state 302 is entered. Only if grovels have been received from all of the available nodes and the coronation timer expired at ascend state 302, are the discovered available up nodes assumed to be the only up and available nodes and the state changed to the ascending state 306 to continue, as previously described. The coronation timer gives the heartbeat function sufficient time to explore all networks in the SP computer system 100 to locate any up nodes. If the coronation timer is too long, the using service provider groups are unnecessarily delayed in providing their service to the domain. Thus, a reasonable intermediate value may be chosen to satisfy both concerns. In the present example, the coronation timer is set at 20 seconds.

Figure 4:
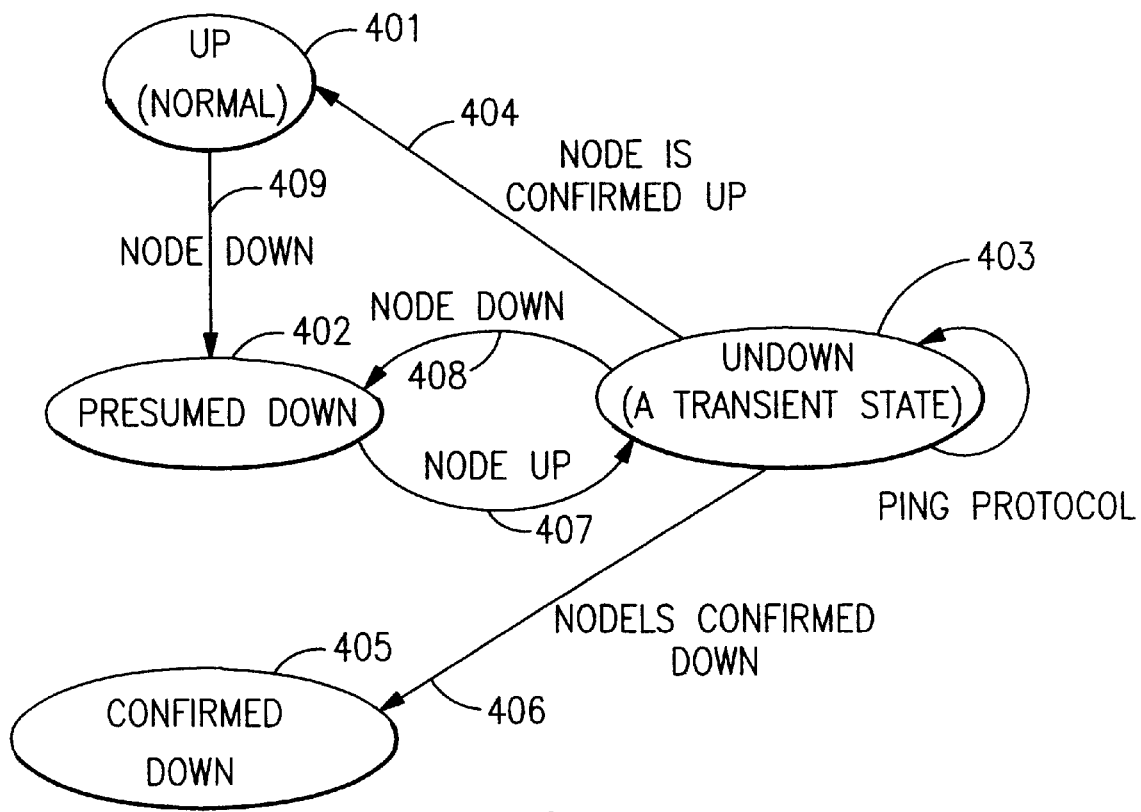
FIG. 4 is a protocol state diagram of a FLICKER protocol whereby the node status state is obtained for a node in a domain of FIG. 2 which is experiencing flicker.

FIG. 4 is a protocol state diagram of a FLICKER protocol wherein a node appears to fail or go down, then appears to be available or comes up, such that its availability is up, goes down and then goes up again in a flicker manner. The apparent failure may be the result of actual failure, or may be the result of such things as partitioning or a temporary network conditions that makes the node appear to have failed. As previously mentioned, the heart beat function is continuously monitoring the status of all nodes in the domain. The normal or up status of a node is shown in FIG. 4 at 401. When the heartbeat function reports that a node has gone down, the state of the node is changed to presumed down at 402 via 409. When the heartbeat function subsequently reports that the node has come back up, group services endeavors to make sure that the node has really once again become available. Thus, the status of the node goes to the undown state 403 via 407, which is a transient state. While in the undown state 403, a message is sent to the failed node and a response is awaited to see if the node is indeed up or down. This process is known as a ping protocol. If a proper acknowledgement is received from the node in response to the ping message the node is returned to the up state 401 via 404 as a result of the node being confirmed in the up status. Ping messages between nodes are well understood in the art, and will not be discussed further. If a negative response is received from the failed node in response to the ping message, the node is confirmed to be down and the node is moved to the confirmed down state 405 via 406. If no response is received, the node is kept in the undown state 403, and the ping messages are periodically sent until a response is received. If the heartbeat function reports a node in the unknown state 405 to have failed, this node is returned to the presumed down state 402 via 408.

Figure 5:
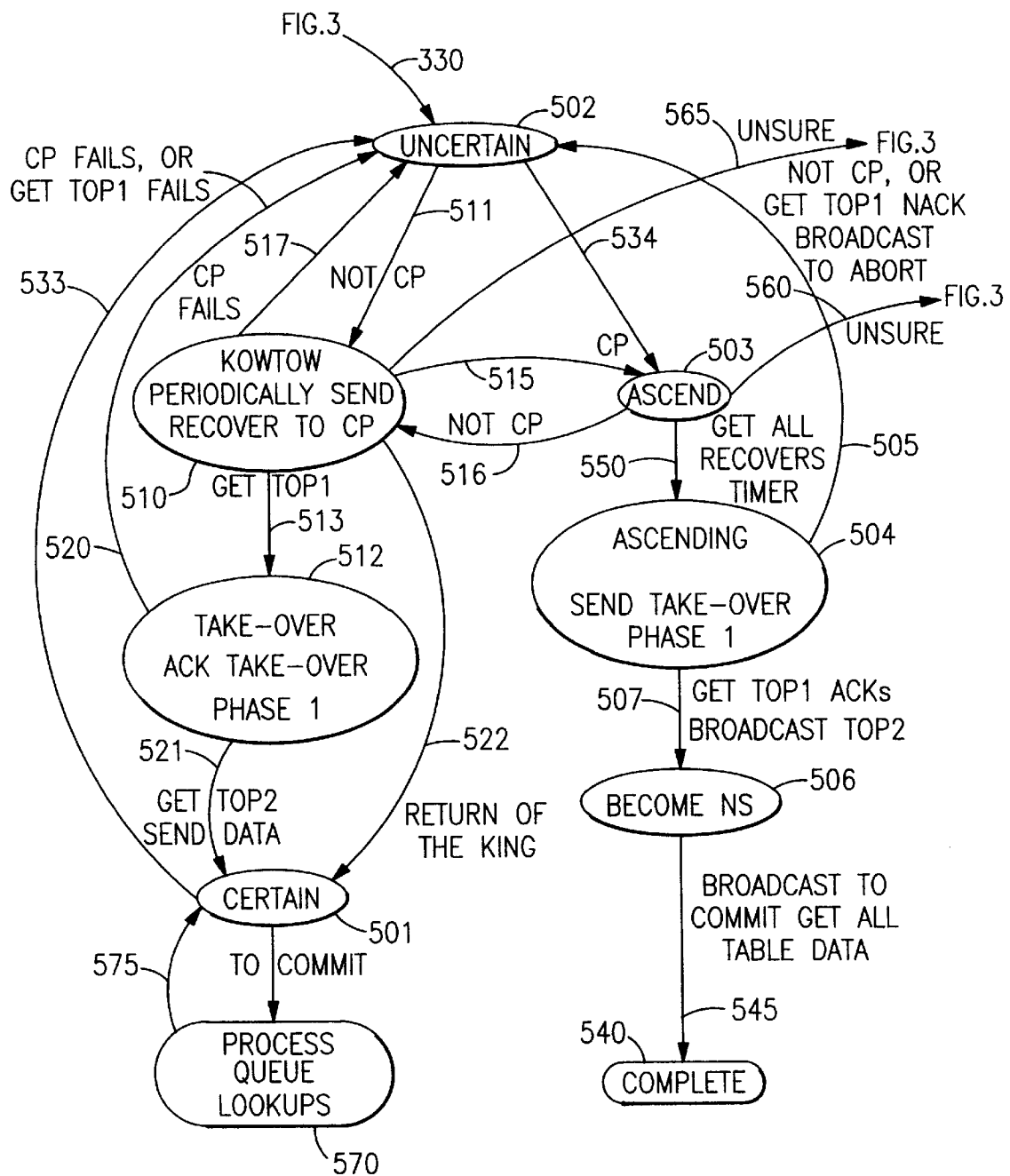
FIG. 5 is a protocol state diagram of the RECOVER protocol for a node in a domain of FIG. 2 which is being recovered after having failed.

FIG. 5 is the protocol state diagram for the RECOVER protocol when the name server node appears to fail. It will be realized that when the name server node fails, a new name server node must be selected through a recovery process such that the duties of the name server may be passed to a surviving node in the domain to properly operate the nodes in the domain. When a node fails, this fact is reported to all of the nodes through the heartbeat function, previously described. When the group services daemon on each of the nodes determines that the name server has failed, each of the group services daemon on each of the nodes progresses through the recovery protocol of FIG. 5. At the beginning of the protocol, the node is in the certain state 501 which is the same as the certain state 317 of FIG. 3. When the name server fails, the state of the nodes change from the certain state 501 to the uncertain state 502 via 533. In the uncertain state 502, the group services daemon consults the membership list to determine who on the list is indicated as the next name server, as described in the aforementioned U.S. patent application Ser. No. 08/640,412. This next name server is identified as the crown prince or CP. If the node is the crown prince, the node moves to the ascend state 503 via 534. If the node receives all of the recover messages from the other nodes it views as currently up, it moves to the ascending state 504. A coronation timer 550 is also present in the ascend state 503, and is the same as the coronation timer 350, previously discussed. Recover messages will be discussed further in connection with the kowtow state 510. While in the ascending state 504, the CP node sends a takeover phase one message to all of the other nodes in the domain. If the node discovers via its local heartbeat function that this node is not the crown prince because a more senior CP in the membership list has come up, or receives a takeover phase one (TOP1) NACK message, it broadcasts an abort message to all of the other nodes and moves back to the uncertain state 502 via 505. If the node receives takeover phase one ACK messages from all of the other nodes, it broadcasts a takeover phase two (TOP2) message to the other nodes, and moves to the become name server state 506 via 507. In response to the TOP2 message, the other nodes send the data necessary to reconstruct the table T for the new name server, such that the new name server can take over the duties of name server. If a node fails before it sends its table T data, it is removed as usual by the name server from the domain, and its absence will have no effect. After the new name server gets all of the data for the table T, it broadcasts a take over commit (TO Commit) message to all of the other nodes to indicate that it is the new name server and moves to the complete state 540 via 545. In the complete state 540, the name server is now ready to process lookups as discussed in the aforementioned U.S. patent application Ser. No. 08/684,246 (Attorney Docket No. PO9-96-080).

If while in the uncertain state 502, the node 10 determines that it is not the crown prince, it moves to the kowtow state 510 via 511. While in the kowtow state, the node periodically sends a recover message to the crown prince as identified in the membership list, previously described. It will be understood at this point that all of the other nodes in the domain are going through the same recovery protocol, and they too are sending periodic recover messages to the crown prince such that when the crown prince arrives at the ascend state 503 it may gather all recovers from all of the other nodes and move to the ascending state 504 as previously described. When the node in kowtow state 510 gets a takeover phase one message from the crown prince in the ascending state 504, the present node moves to the takeover state 512 via 513 and the node sends an ACK message in response to the takeover phase one message so that the crown prince in the ascending state 504 may, after the receipt of ACKS from all nodes in the domain, move to the become name server state 506.

If while in the kowtow state 510, the node discovers that it is the crown prince, the node moves to the ascend state 503 via 515. Also, if the node in the ascend state 503 discovers that it is not the crown prince because a more senior CP in the membership list has come up, it moves from the ascend state 503 to the kowtow state 510 via 516. If, while in the kowtow state 510, the node determines that the crown prince node fails, this node returns to the uncertain state 502 via 517. If, while in the takeover state 512, the node discovers that the crown prince node fails or if it gets a takeover phase one abort message, the node moves from the takeover state 512 back to the uncertain state 502 via 520. If, while in the takeover state 512, the node receives a takeover phase two message, it sends the data necessary to rebuild the T table to the new name server and moves to the certain state 501 via 521. Thus when the node moves to the certain state 501 it once again knows that it is not the name server but it knows who the name server is, that is the node that has reached state 506.

When the node is in the kowtow state 510 and the name server node whose failure started the recovery process returns to the confirmed up state as discussed in connection with FIG. 4, the condition known as the return of the king has been detected. In that case, the node moves from the kowtow state 510 to the certain state 501 via 522, recovery is stopped and the old name server remains the name server node.

If any lookup messages are generated during the PROCLAIM or RECOVER protocols, the lookup messages are queued locally until the nodes are in either the PROCLAIM certain state 317 or the RECOVER certain state 501. In the PROCLAIM protocol, messages stored locally in the lookup queue are processed at 360 by sending the messages to the name server when the node enters the certain state 317. In the RECOVER protocol, when the node is in the certain state 501 and receives a take over commit (TOC) message from the new name server, the node processes the messages stored locally in the lookup queue by sending the messages to the name server, as shown at 570, and returns or remains in the certain state 501 via 575.

Returning to the inserting state 316 of the PROCLAIM protocol of FIG. 3, if the node determines that the RNS node fails, the node must seek to determine who the new name server is, but is not sure if there are any nodes remaining in the domain. The node then sets an unsure flag and goes to the uncertain state 502 of the RECOVER protocol of FIG. 5 via 330.

Returning to FIG. 5, if while in the ascend state 503, the node determines that the unsure flag is set, and all of the other nodes have failed, the node goes to the uncertain state 301 of the PROCLAIM protocol of FIG. 3 via 560. Likewise, if while in the kowtow state 510, the node determines that the uncertain flag is set, and that all other nodes in the domain have failed, the node goes to the uncertain state 301 of the PROCLAIM protocol of FIG. 3 via 565. These last two conditions may arise when the name server fails, and there are no other nodes up in the domain. In that case, the node must go to the PROCLAIM protocol to establish the domain.

Upon reaching the certain state 501 of the RECOVER protocol or the uncertain state 301 of the PROCLAIM protocol, the unsure flag is cleared.

Thus, the present invention provides for establishing a name server node for all the nodes in a domain as the nodes first come on line. Also disclosed, is a protocol for confirming whether a node is up or down when the node is experiencing flicker. Also disclosed, is a protocol for recovery such that a new name server may be selected when the old name server node fails or goes down.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described my invention, what we claim as new, and desire to secure by Letters Patent is:

1. An apparatus for the recovery of a name server managing membership of a domain of processors in a distributed computing environment, the apparatus comprising:

failure detecting means for detecting the failure of the name server node;

consulting means for consulting a membership list of nodes in the domain to determine the crown prince (CP) node who is next in line to become the name server;

recover sending means for periodically sending recover messages from all of the other available nodes in the domain to the CP node;

two phase performing means responsive to receiving all of said recover messages from all other available nodes in the domain by said CP node, said two phase performing means for performing a two phase takeover whereby the CP node becomes the name server for managing said processors in said domain.

2. The apparatus of claim 1 wherein said two phase performing means comprises:

TOP1 message sending means for sending from said CP node, a takeover phase 1 (TOP1) message to the other nodes available in the domain;

ACK message sending means for sending an acknowledge (ACK) message from said other available nodes to said CP node responsive to said TOP1 message; and TOP2 message sending means for sending a takeover phase 2 (TOP2) message to said other available nodes responsive to said ACK messages thereby notifying them that the CP node has become the name server.

3. The apparatus of claim 2 further comprising:

data sending means for sending data to the name server from said other available nodes in the domain responsive to the TOP2 messages, said data necessary for the name server to manage the other available nodes in the domain.

4. The apparatus of claim 3 further comprising:

local storing means at each node for storing all request messages requesting management by the name server, said local storing means storing said request messages after the detection of the failure of the name server;

TO commit message sending means for sending a takeover commit (TO commit) message to said other available nodes in the domain after said CP becomes the name server; and request message processing means at each node in said domain for processing said locally stored request messages by said other available nodes responsive to said TO commit messages.

5. The apparatus of claim 1 comprising:

a timer for timing the receipt of said recover messages for a set period of time and receiving said recover messages only during said set period of time.

6. The apparatus of claim 3 comprising:

FLICKER protocol means for periodically pinging the name server that was detected as failed for determining if the detected failed name server is again available;

aborting means for aborting the takeover by said CP node, said aborting means being responsive to said pinging that determines that the detected fail name server is again available before the sending of said TOP2 message and restoring the again available failed name server as the name server managing the available nodes in the domain.

7. An apparatus for the recovery of a name server managing membership of a domain of processors in a distributed computing environment, the apparatus comprising:

a failure detector detecting the failure of the name server node;

a consulting daemon consulting a membership list of nodes in the domain to determine the crown prince (CP) node who is next in line to become the name server;

a recover message sender for periodically sending recover messages from all of the other available nodes in the domain to the CP node;

a two phase process means responsive to receiving all of said recover messages from all other available nodes in the domain by said CP node, said two phase process performing a two phase takeover whereby the CP node becomes the name server for managing said processors in said domain.

8. The apparatus of claim 7 wherein said two phase process comprises:

a TOP1 message sender sending from said CP node, a takeover phase 1 (TOP1) message to the other nodes available in the domain;

an ACK message sender sending an acknowledge (ACK) message from said other available nodes to said CP node responsive to said TOP1 message; and a TOP2 message sender sending a takeover phase 2 (TOP2) message to said other available nodes responsive to said ACK messages thereby notifying them that the CP node has become the name server.

9. The apparatus of claim 8 further comprising:

a data sender sending data to the name server from said other available nodes in the domain responsive to the TOP2 messages, said data necessary for the name server to manage the other available nodes in the domain.

10. The apparatus of claim 9 further comprising:

a local storage at each node for storing all request messages requesting management by the name server, said local storage storing said request messages after the detection of the failure of the name server;

a TO commit message sender sending a takeover commit (TO commit) message to said other available nodes in the domain after said CP becomes the name server; and a request message process at each node in said domain, said request message process processing said locally stored request messages by said other available nodes responsive to said TO commit messages.

11. The apparatus of claim 7 comprising:

a timer timing the receipt of said recover messages for a set period of time and receiving said recover messages only during said set period of time.

12. The apparatus of claim 9 comprising:

a FLICKER protocol periodically pinging the name server that was detected as failed for determining if the detected failed name server is again available;

an aborting process aborting the takeover by said CP node, said aborting process being responsive to said pinging that determines that the detected fail name server is again available before the sending of said TOP2 message and restoring the again available failed name server as the name server managing the available nodes in the domain.

13. A program product for the recovery of a name server managing membership of a domain of processors in a distributed computing environment, the program product comprising:

a computer readable medium on which is recorded computer code for causing a computer to execute a computer program;

computer code recorded on said computer readable medium for detecting the failure of the name server node;

computer code recorded on said computer readable medium for consulting a membership list of nodes in the domain to determine the crown prince (CP) node who is next in line to become the name server;

computer code recorded on said computer readable medium for periodically sending recover messages from all of the other available nodes in the domain to the CP node;

computer code recorded on said computer readable medium responsive to receiving all of said recover messages from all the other available nodes in the domain by said CP node, and for performing a two phase takeover whereby the CP node becomes the name server for managing said processors in said domain.

14. The program product of claim 13 wherein the two phase takeover comprises:

computer code recorded on said computer readable medium for sending from said CP node, a takeover phase 1 (TOP1) message to the other nodes available in the domain;

computer code recorded on said computer readable medium responsive to said TOP1 message, and for sending an acknowledge (ACK) message from said other available nodes to said CP node; and computer code recorded on said computer readable medium responsive to said ACK messages, and for sending a takeover phase 2 (TOP2) message to said other available nodes notifying them that the CP node has become the name server.

15. The program product of claim 14 further comprising:

computer code recorded on said computer readable medium responsive to the TOP2 messages, and for sending data to the name server from said other available nodes in the domain data necessary for the name server to manage the other available nodes in the domain.

16. The program product of claim 15 further comprising:

computer code recorded on said computer readable medium for storing locally at each node after the detection of the failure of the name server, all request messages requesting management by the name server;

computer code recorded on said computer readable medium for, after said CP becomes the name server, sending a takeover commit (TO commit) message to said other available nodes in the domain; and computer code recorded on said computer readable medium responsive to said To commit messages, and for processing said locally stored request messages by said other available nodes.

17. The program product of claim 13 comprising:

computer code recorded on said computer readable medium for timing the receipt of said recover messages for a set period of time; and computer code recorded on said computer readable medium for receiving said recover messages only during said set period of time.

18. The program product of claim 15 comprising:

computer code recorded on said computer readable medium for periodically pinging the name server that was detected as failed for determining if the detected failed name server is again available;

computer code recorded on said computer readable medium responsive to said pinging that determines that the detected fail name server is again available before the sending of said TOP2 message, and for aborting the takeover by said CP node; and computer code recorded on said computer readable medium for restoring the again available failed name server as the name server for managing the available nodes in the domain.

\* \* \* \* \*